United States Patent [19]

Wojcik

[11] 4,130,369

[45] Dec. 19, 1978

[54] DOWEL PIN

[75] Inventor: Thaddeus A. Wojcik, Greensburg, Pa.

[73] Assignee: The United States of America as represented by the United States Department of Energy, Washington, D.C.

[21] Appl. No.: 837,254

[22] Filed: Sep. 27, 1977

[51] Int. Cl.² .................... F16B 13/00

[52] U.S. Cl. .................... 403/297; 85/37; 29/526 R

[58] Field of Search .................... 85/39, 37; 403/297, 403/292; 30/344; 29/512, 523, 526; 24/213 CS

[56] References Cited

U.S. PATENT DOCUMENTS

| | | | |
|---|---|---|---|
| 1,736,999 | 11/1929 | Davis | 29/512 |
| 1,947,906 | 2/1934 | Fine | 29/512 |
| 2,292,467 | 8/1942 | Norsell | 29/523 |
| 2,529,420 | 11/1950 | Ramquist | 24/214 |
| 4,012,155 | 3/1977 | Morris | 24/213 CS |

FOREIGN PATENT DOCUMENTS

| | | | |
|---|---|---|---|
| 2320389 | 10/1974 | Fed. Rep. of Germany | 29/523 |

*Primary Examiner*—Andrew V. Kundrat
*Attorney, Agent, or Firm*—Dean E. Carlson; Frank H. Jackson

[57] ABSTRACT

Two abutting members are locked together by reaming a hole entirely through one member and at least partly through the other, machining a circular groove in each through hole just below the surface of the member, press fitting a dowel pin having a thin wall extension on at least one end thereof into the hole in both members, a thin wall extension extending into each through hole, crimping or snapping the thin wall extension into the grooves to positively lock the dowel pin in place and, if necessary, tack welding the end of the thin-wall extension in place.

3 Claims, 4 Drawing Figures

17

16

18

10

11

15

13

14

12

DOWEL PIN

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a self-locking dowel pin. In more detail, the invention relates to an assembly including a substrate member, a member to be immobilized and a dowel pin which locks the members together. The invention also relates to a method of locking two abutting members together.

A dowel pin is defined in Webster's Third New International Dictionary (Unabridged) as "a headless smooth or barbed pin usually of circular section fitting into corresponding holes in abutting pieces to act as a temporary fastener or to keep them permanently in their proper relative positions". Dowel pins are frequently used in nuclear reactors to lock two abutting members together as when a member to be immobilized is locked to a substrate member. In view of the nature of the use — the members are subject to heat cycling and vibration over a long period of time — the dowel pins must be emplaced so as to lock the two members together with no possibility the dowel pin could slip out of place. Also, it is essential that the pieces of a dowel pin that has sheared due to relative movement of the members remain in place. A loose dowel pin or piece of a dowel pin in a nuclear reactor could be disastrous.

In practice it has been found necessary to weld dowel pins in place with a 360° weld when the dowel pin is used in a power reactor. For many nuclear reactor applications where the dowel pin is in a "sensitive" location, distortions created by welding constitute a serious problem. Since 360° welding has heretofore been necessary, careful nondestructive testing of the welds has been necessary to ensure that damaging distortion has not occurred.

SUMMARY OF THE INVENTION

Two abutting members are locked together by reaming a hole entirely through one member and at least partly through the other member, machining a circular groove in each through hole just below the surface of the member, press fitting a dowel pin having a thin wall extension on at least one end thereof into the holes in both members and crimping or snapping the end of the thin wall extension into the grooves to positively lock the dowel pin in place.

DETAILED DESCRIPTION OF THE INVENTION

Figure 1:
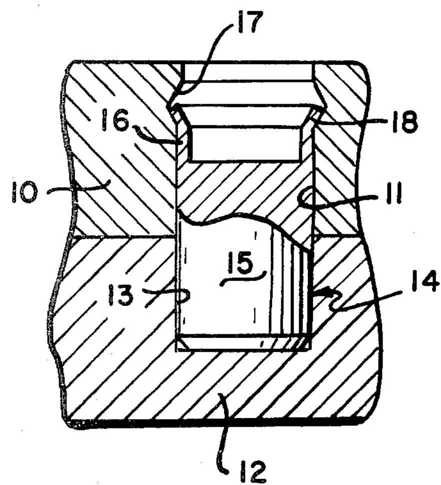
FIG. 1 is a vertical sectional view of an assembly locked together in accordance with the present invention.

As shown in FIG. 1, a metal member 10 having a through hole 11 therein is locked to an abutting metal substrate member 12 having a blind hole 13 therein by a metal dowel pin 14 having a solid shaft portion 15 and a thin wall extension 16 thereon extending through the through hole 11 in member 10 and into the blind hole 13 in member 12. Extension 16 is of the same diameter as the body of the dowel pin and integral therewith. Extension 16 may for example be $\frac{1}{4}$–$\frac{3}{8}$" long and 15–20 mils in diameter. Holes 11 and 13 are reamed to the same size and a circular groove 17 is machined into the surface of through hole 11 just below the surface of member 10. Dowel pin 14 is press fit into holes 11 and 13 and the edge of extension 16 is crimped down into groove 17 to form a lip 18 thereon to positively lock the dowel pin in place. Even if the dowel pin 14 were to shear due to relative motion of members 10 and 12, the pieces thereof could not readily be jarred loose from their location. For a power reactor the end of extension 16 of dowel pin 14 may be tack welded to member 10 in several locations. Due to the thin wall of the extension 16, little or no distortion will be caused by the welding operation.

Figure 2:
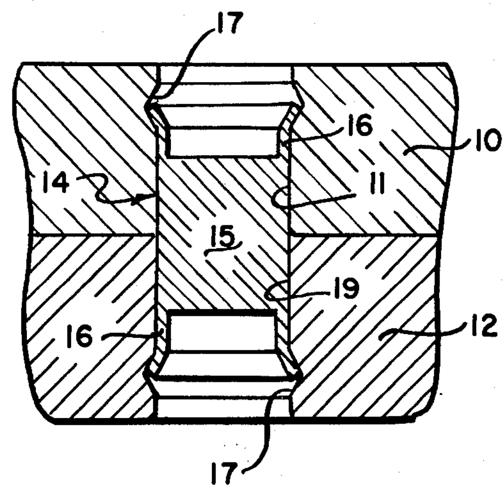
FIG. 2 is a modification thereof wherein both members of the assembly have a through hole therein.

The embodiment shown in FIG. 2 is identical to that shown in FIG. 1 except that member 12 also has a through hole 19 therein having a circular groove 17 therein. Dowel pin 14 has extensions 16 on both ends thereof and the edges of both extensions are crimped down into grooves 17 in the interior surface of holes 11 and 19.

Figure 3:
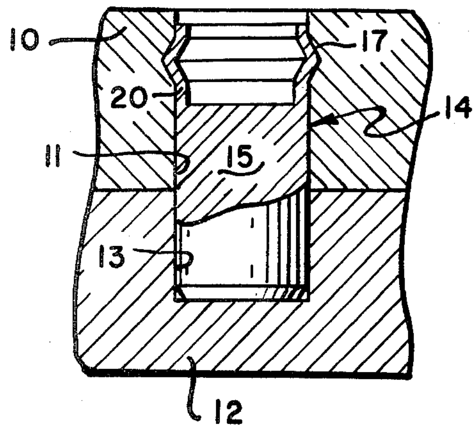
FIG. 3 is a vertical sectional view of an alternative embodiment and FIG. 4 is a vertical sectional view of still another embodiment.

A slightly different embodiment of the invention is disclosed in FIG. 3. As shown in this figure, extension 20 is crimped into groove 17 using a special, easily constructed crimping tool to deform the metal extension to conform to the shape of the groove while extending a short distance past the groove. Thus the extension 20 winds up having a rib therearound conforming in shape to the groove 17. This increases the bearing area of the extension of the dowel pin on the interior surface of the hole in member 10 and thus increases the degree of positive locking attained. If both members have through holes therein, extensions on both ends of the dowel pins will be crimped into grooves in the holes in the members 10 and 12 as in FIG. 2 and tack welding may be employed as in FIG. 1.

Figure 4:
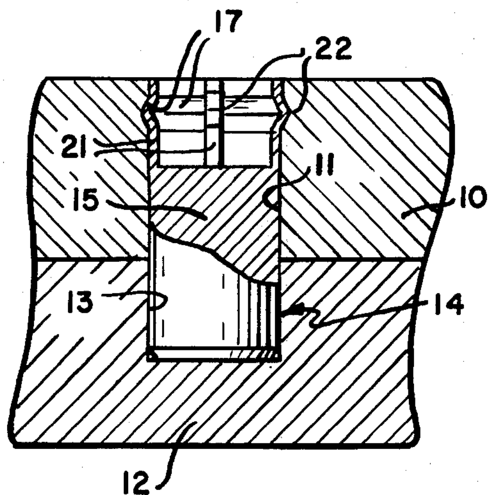

According to both of the preceding embodiments, the extensions are mechanically deformed into the grooves 17 in the holes in the members 10 and 12. According to the embodiment of FIG. 4, a plurality of spring clips 21 having a rib 22 conforming to grooves 17 constitute an extension to shaft portion 15 of dowel pin 14. Spring action causes rib 22 thereon to spring into groove 17 when the dowel pin is press fit into holes 11 and 13.

The embodiments of the invention in which an exclusive property or privilege is claimed are defined as follows:

1. In combination, a substrate member and a member to be immobilized with respect thereto, at least one of the members having a through hole therein and the other member having at least a blind hole therein, said holes being in registry, an interior groove near the exterior surface of each member having a through hole therein and in the surface of said through hole, a self-locking dowel pin press fit into the holes to tie the two members together, said dowel pin having a solid shaft portion and a thin wall internally expandable extension section of the same diameter as the solid shaft portion of the pin on each end of the dowel pin facing an open hole, said thin wall extension being crimped into the groove to form a rib of uniform thickness the same as the extension and conforming to the shape of the groove, with the free end of said extension being tuck welded in place.

2. The combination of claim 1 wherein the edge of the thin wall extension is crimped into the groove to form a flange on the extension which locks the pin in place.

3. The combination of claim 1 wherein said thin wall extension is snapped into the groove.

* * * * *